(12) United States Patent
Kueppers et al.

(10) Patent No.: US 8,404,079 B1
(45) Date of Patent: Mar. 26, 2013

(54) COMPOSITION AND METHOD RELATING TO A HOT MELT ADHESIVE

(75) Inventors: Michelle C. Kueppers, North Oaks, MN (US); Steven W. Albrecht, Forest Lake, MN (US); Mark S. Kroll, Arden Hill, MN (US); Vitaly Rogachevsky, Woodbury, MN (US)

(73) Assignee: H.N. Fuller Company, St. Paul, MN (US)

( * ) Notice: Subject to any disclaimer, the term of this patent is extended or adjusted under 35 U.S.C. 154(b) by 1301 days.

(21) Appl. No.: 11/933,833

(22) Filed: Nov. 1, 2007

Related U.S. Application Data

(63) Continuation-in-part of application No. 11/156,433, filed on Jun. 20, 2005.

(60) Provisional application No. 60/600,041, filed on Aug. 9, 2004.

(51) Int. Cl.
*B32B 27/00* (2006.01)
*B29C 65/00* (2006.01)

(52) U.S. Cl. .......... 156/334; 156/325; 156/701

(58) Field of Classification Search .......... 156/344, 156/327, 334, 247, 297, 299, 325, 326, 701; 428/34.2; 53/447, 540, 541; 206/460
See application file for complete search history.

(56) References Cited

U.S. PATENT DOCUMENTS

| | | | |
|---|---|---|---|
| 3,113,673 A | 12/1963 | Stein | |
| 3,356,765 A * | 12/1967 | Musso et al. | 525/240 |
| 3,573,240 A | 3/1971 | Flanagan | |
| 4,075,290 A * | 2/1978 | Denzel et al. | 525/240 |
| 4,365,710 A | 12/1982 | Swanson | |
| 4,826,909 A | 5/1989 | Lakshmanan et al. | |
| 4,830,926 A | 5/1989 | Moster et al. | |
| 4,833,192 A | 5/1989 | Lakshmanan et al. | |
| 4,833,193 A | 5/1989 | Sieverding et al. | |
| 4,907,741 A | 3/1990 | McIntyre | |
| 4,956,207 A | 9/1990 | Kauffman et al. | |
| 5,024,888 A | 6/1991 | Hwo et al. | |
| 5,106,447 A | 4/1992 | Di Rado et al. | |
| 5,256,717 A | 10/1993 | Stauffer et al. | |
| 5,419,431 A | 5/1995 | Neuber et al. | |
| 5,450,708 A | 9/1995 | Lashyro | |
| 5,624,986 A | 4/1997 | Bunnelle et al. | |
| 5,627,229 A | 5/1997 | Bunnelle et al. | |
| 5,887,717 A | 3/1999 | Anderson et al. | |
| 6,008,148 A | 12/1999 | Harris et al. | |
| 6,114,261 A | 9/2000 | Strelow et al. | |
| 6,143,846 A | 11/2000 | Herrmann et al. | |
| 6,182,442 B1 | 2/2001 | Schmidt et al. | |
| 6,218,457 B1 | 4/2001 | Fralich | |
| 6,244,502 B1 | 6/2001 | Hollar et al. | |

(Continued)

FOREIGN PATENT DOCUMENTS

| | | |
|---|---|---|
| EP | 0 331 410 | 9/1989 |
| EP | 0 518 045 | 12/1992 |

(Continued)

OTHER PUBLICATIONS

Bulletin: "Polybutene-1 DP 8910 PC", Data Sheet, Basell Polyolefins, (2 pages), 2004.

(Continued)

*Primary Examiner* — John Goff

(74) *Attorney, Agent, or Firm* — Kristin Stone; Kristi Halloran

(57) ABSTRACT

The invention includes a hot melt adhesive composition that includes at least one of an isotactic copolymer of butene-1 and a metallocene catalyzed propylene homopolymer, a tackifying resin, and, optionally, a wax. The adhesive composition initially exhibits adhesion quality and subsequently non-adhesion quality. The invention also includes methods of using the adhesive composition for temporarily bonding substrates.

15 Claims, 1 Drawing Sheet

U.S. PATENT DOCUMENTS

Figure 1:
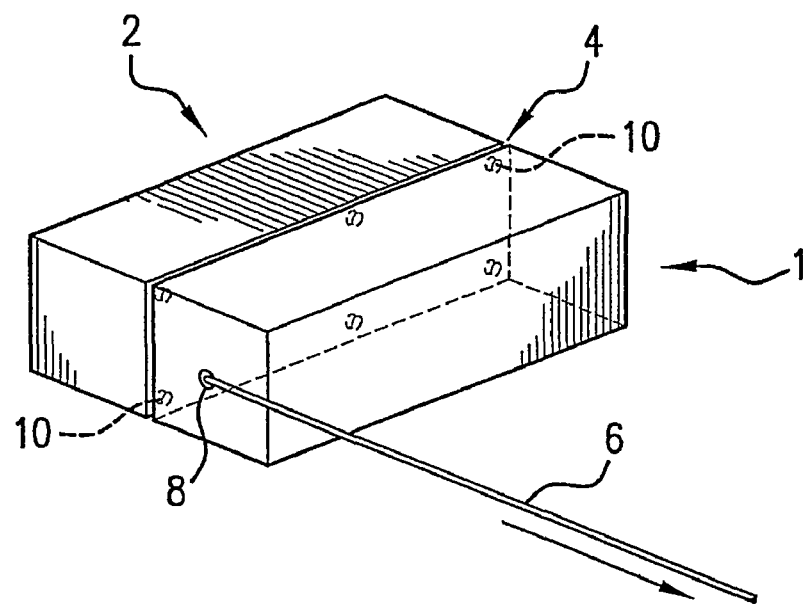

| | | |
|---|---|---|
| 6,331,590 B1 | 12/2001 | Herrmann et al. |
| 6,499,596 B1 | 12/2002 | Anderson et al. |
| 6,863,989 B1 | 3/2005 | Dyatlov et al. |
| 7,048,817 B1 * | 5/2006 | Hammond ............ 156/64 |
| 2003/0150760 A1 | 8/2003 | Anderson et al. |
| 2004/0253464 A1 | 12/2004 | Krawinkel |
| 2005/0159566 A1 | 7/2005 | Minami et al. |
| 2005/0288412 A1 | 12/2005 | Hohner et al. |
| 2006/0027320 A1 * | 2/2006 | Kueppers et al. ............ 156/327 |
| 2006/0074171 A1 | 4/2006 | Bach et al. |
| 2007/0117907 A1 | 5/2007 | Bach et al. |

FOREIGN PATENT DOCUMENTS

EP     1 080 013     3/2001

OTHER PUBLICATIONS

Bulletin: "Polybutene-1 for Hot Melt Adhesives", General Bulletin, Basell Polyolefins, (11 pages), Undated.

Bulletin: "Polybutene-1 Vereelility, Value and Opportunity", General Bulletin, Basell Polyolefins, (11 pages), Undated.

\* cited by examiner

COMPOSITION AND METHOD RELATING TO A HOT MELT ADHESIVE

CROSS-REFERENCE TO RELATED APPLICATIONS

This application is a continuation-in-part application of U.S. patent application Ser. No. 11/156,433, filed on Jun. 20, 2005, and claims the benefit of U.S. Provisional Application Ser. No. 60/600,041, filed on Aug. 9, 2004, both of which are incorporated herein.

FIELD OF THE INVENTION

The invention relates to a hot melt adhesive composition including a polymer that is at least one of an isotactic copolymer of butene-1 and a metallocene catalyzed propylene homopolymer, tackifying resin, and, optionally, wax. The adhesive composition is useful for temporarily bonding substrates.

BACKGROUND OF THE INVENTION

Hot melt adhesives are widely used for various applications. Typically, hot melt adhesives are designed to bond to and remain bonded to two substrate surfaces such that the two surfaces cannot be separated without damaging or destroying the substrates. For example, if the substrates are paperboard, a permanent bond may be formed by using typical hot melt adhesives such that if one attempts to separate the substrates, tearing and/or destruction of one or both of the substrates will occur. One disadvantage of such adhesives is that, in certain applications, it is desirable that the adhesive bond be strong, but temporary rather than permanent such that after a period of time, the substrates can be separated without destroying one or both substrates. Additionally, for some, but not all applications, any residual hot melt on the substrates may be seen as being aesthetically undesirable for some applications if the hot melt can easily be seen due to its color or if the hot melt remains tacky. On the other hand, some known hot melt adhesives release with the desirable aesthetic properties, but lack the necessary initial adhesion to be useful for many applications.

Therefore, there is a need in the art for an adhesive composition that allows for binding of two substrates for a period of time and that subsequently loses its adhesive qualities, thereby allowing the two substrates to be easily separated without a negative aesthetic alteration of the substrates' surface.

BRIEF SUMMARY OF THE INVENTION

In one aspect, the invention features a hot melt composition that initially exhibits adhesion and subsequently exhibits non-adhesion. In one embodiment, the hot melt adhesive composition includes from about 10% by weight to about 80% by weight of an isotactic copolymer of butene-1, from about 5% by weight to about 60% by weight of a wax, and from about 5% by weight to about 70% by weight of a tackifying resin. In another embodiment, the hot melt composition includes a metallocene catalyzed propylene homopolymer, a tackifying resin, and optionally a wax.

In another aspect, the invention features a method of temporarily securing substrates or containers together. The method includes providing a hot melt composition disclosed herein and applying the composition to a first substrate. A second substrate is applied to the composition on the first substrate, creating a bond between the first and second substrates. The composition creates the bond as it exhibits adhesion qualities initially, yet subsequently it exhibits non-adhesion qualities that enable the substrates to be separated without fiber tear.

In one embodiment, the method includes applying a means for securably releasing substrates (e.g., containers), the means including a hot melt composition disclosed herein.

In another embodiment, the method of using a hot melt composition to temporarily adhesively bond a first substrate and a second substrate includes applying the composition to a first surface of the first substrate to create a first bonding surface, and contacting the first bonding surface to the second substrate to form a bond, the composition consisting essentially of metallocene catalyzed polypropylene homopolymer, tackifying resin, and wax, and the composition exhibiting at least about 60% fiber tear after 10 minutes and no greater than about 20% fiber tear after 24 hours when tested according to at least one of the Median Coupon Test and the Modified Median Coupon Test. In some embodiments, the metallocene catalyzed polypropylene homopolymer has a heat of fusion of no greater than about 40 J/g.

In another embodiment, the composition consists essentially of from about 20% by weight to about 80% by weight metallocene catalyzed polypropylene homopolymer, from about 5% by weight to about 70% by weight tackifying resin, and from about 5% by weight to about 60% by weight wax.

In other embodiments, the composition further includes a polymer other than a metallocene catalyzed polypropylene homopolymer. In one embodiment, the polymer includes an isotactic copolymer of butene-1.

In another embodiment, at least one of the substrates comprises at least one of paperboard and corrugated paperboard.

In other embodiments, the composition exhibits at least about 70% fiber tear after 10 minutes and no greater than about 10% fiber tear after 24 hours when tested according to at least one of the Median Coupon Test and the Modified Median Coupon Test.

In some embodiments, the composition exhibits a melt viscosity of from about 40 cps to about 2,000 cps at 350° F. (177° C.).

In one embodiment, the composition consists essentially of metallocene catalyzed polypropylene homopolymer and tackifying resin.

In another aspect, the invention features an article of manufacture that includes a first substrate, a second substrate, and a hot melt composition sandwiched between the first and the second substrates, the composition consisting essentially of metallocene catalyzed polypropylene homopolymer, tackifying resin, and optionally wax, and exhibiting at least about 60% fiber tear after 10 minutes and no greater than about 20% fiber tear after 24 hours when tested according to at least one of the Median Coupon Test and the Modified Median Coupon Test. In one embodiment, one of the substrates includes paperboard, corrugated paperboard, paper or a combination thereof.

In another aspect, the invention features a method of temporarily adhering a first container to a second container, the method including applying a hot melt composition comprising a metallocene catalyzed polypropylene homopolymer to a first surface of the first container to form a first bonding surface, and contacting the first bonding surface of the first container with the second container to temporarily adhesively bond the first container to the second container through the composition. In one embodiment, the method further includes allowing the composition to lose adhesion, thereby releasing the second container from the first container with no greater than about 20% fiber tear after 24 hours when tested according to at least one of the Median Coupon Test and the Modified Median Coupon Test. In some embodiments, the first and the second containers are paperboard containers.

In one embodiment, the composition exhibits a Loop Tack of less than about 5 ounces per inch.

In some embodiments, the composition further includes tackifying resin, wax, antioxidant, or a combination thereof.

In another embodiment, at least one of the first and the second containers is filled with consumer goods, the consumer goods having been placed into the container on an automated packaging line, and the first and the second containers are separable from each other with no greater than about 20% fiber tear prior to a sale to a customer at a final point of sale.

In other embodiments the article includes mated containers that include at least one first container bonded to at least one second container through a hot melt composition comprising a metallocene catalyzed polypropylene homopolymer. In one embodiment, at least one of the first and the second containers includes paperboard. In another embodiment, the first and the second containers are separable from each other with no greater than about 20% fiber tear prior to a sale to a customer at a final point of sale.

In another aspect, the invention features a hot melt composition that includes a means for securably releasing two substrates, wherein the means exhibits at least about 70% fiber tear after 10 minutes and no greater than about 10% fiber tear after 24 hours when tested according to at least one of the Median Coupon Test and Modified Median Coupon Test.

In other aspects, the invention features an article that includes a first substrate, a second substrate, and a means for temporarily adhesively bonding the first substrate and the second substrate, the first substrate being temporarily adhered to the second substrate through the means, the means being disposed between the first and the second substrates.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the detailed description and examples are to be regarded as illustrative in nature and not restrictive. All weights are given as percentages of the total weight of the composition unless otherwise indicated. All references are incorporated herein in their entirety.

GLOSSARY

The term "consisting essentially of," as used herein with respect to a composition, means that the composition is free of additional components that alter the fiber tear properties of the composition after 10 minutes and after 24 hours when tested according to at least one of the Median Coupon Test and the Modified Median Coupon Test.

DRAWINGS

Figure 2:
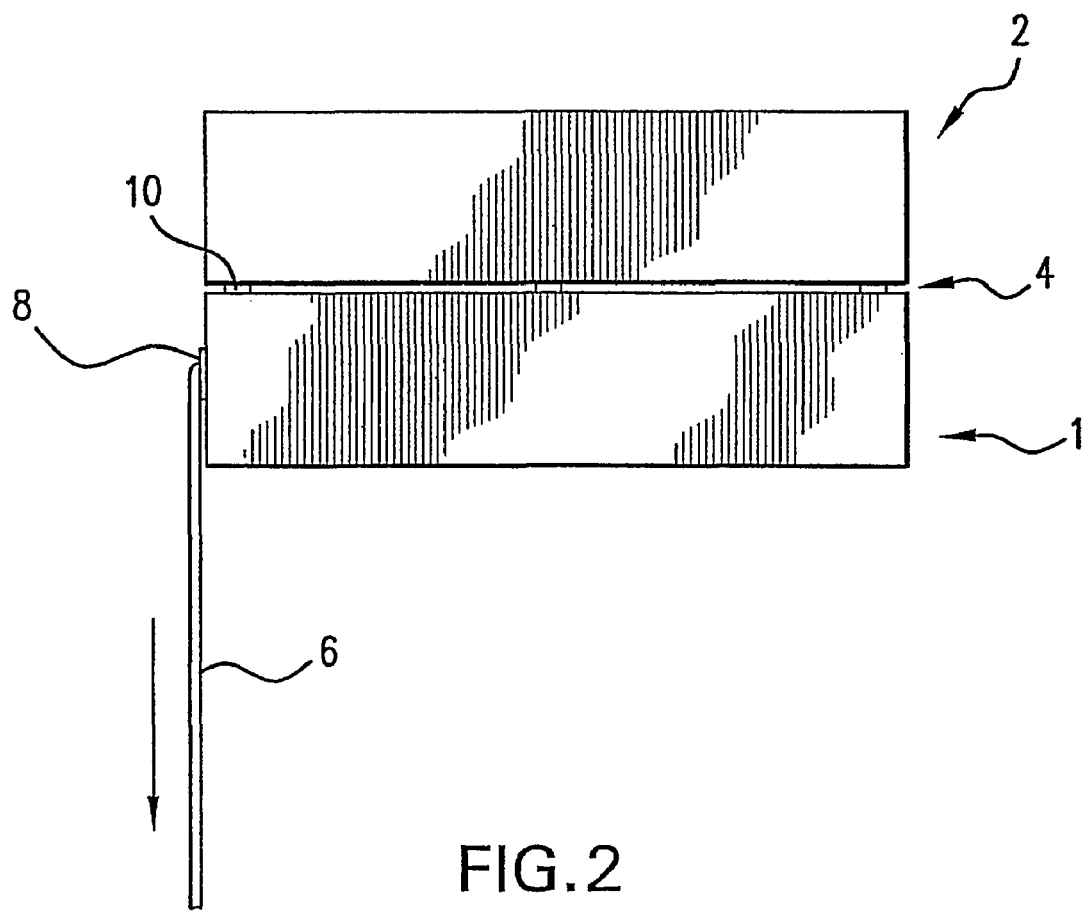

FIG. 1 is a perspective view and FIG. 2 is a top view of containers adhered with a composition of the present invention illustrating the string attachment and pull direction for the Separation Resistance Test and Modified Separation Resistance Test used herein.

DETAILED DESCRIPTION

The methods and compositions of the invention are directed to a hot melt adhesive that initially exhibits adhesion qualities and subsequently exhibits non-adhesion qualities. More particularly, the adhesives of the invention uniquely and unexpectedly undergoes the following property changes sequentially: The adhesive as initially applied typically has little bond strength (e.g. will fail a Separation Resistance Test initially); at about the "Set Time", a bond has formed (e.g. will pass a Separation Resistance Test at 10 seconds); the bond then holds its integrity for a period of time (e.g. will pass the Separation Resistance Test for a period of time after 10 seconds); and the adhesive then looses its adhesive qualities (e.g. will have no Fiber Tear). It is often beneficial for the adhesive to be non-tacky at this point.

For example, the composition of the present invention form an adhesive bond in from about 0.5 seconds to about 10 minutes after the application of the composition to a substrate/container. The compositions then gradually lose the bond strength in from about 11 minutes to about 24 hours after the application of the composition. This adhesive bond that initially has strength and then loses bond strength is referred to herein as a "temporary adhesive bond". Such initial formation of the adhesive bond and gradual loss of the adhesive bond can further be reflected by the phenomenon that the composition exhibits at least about 60% fiber tear after about 10 minutes and no greater than about 20% fiber tear after about 24 hours according to Median Coupon Test or Modified Median Coupon Test described below.

The adhesive is thus useful in various applications, including palletizing and any other short-term temporary adhesive bonding applications where initially a bond between substrates is useful, such as temporarily bonding boxes together, and then subsequently the substrates (e.g. boxes) can be separated easily without unsightly Fiber Tear.

I. Composition: The compositions of the invention have a desired and unique combination of "adhesion" and "non-adhesion" properties as described and defined by tests below. The compositions are exhibit initial adhesion followed by subsequent non-adhesion such that they securably release two substrates. The compositions include a polymer (e.g., isotactic copolymers of butene-1, metallocene catalyzed propylene homopolymer(s), and combinations thereof) that crystallizes over time, which weakens the adhesive bond of the composition over time and provides a means for obtaining the desired securably releasing properties. The composition also includes a tackifying resin, and, optionally, a wax as described in greater detail below.

A1. Isotactic copolymer of butene-1: Isotactic copolymers of butene-1 can be included in the composition, for example, in an amount ranging from about 10% by weight to about 80% by weight of the composition. Alternatively, the concentration of butene-1 copolymer ranges from about 20% to about 70% by weight of the composition. In a further alternative, the concentration ranges from about 30% by weight to about 45% by weight of the composition.

Preferred isotactic copolymers of butene-1 are copolymers of butene-1 and a member selected from the group consisting of ethylene, propylene and mixtures thereof. In one aspect of the invention, the concentration of butene-1 in the copolymer is in an amount ranging from about 90% to about 99% by weight of the copolymer. Alternatively, the concentration of butene-1 ranges from about 92% by weight to about 98% by weight of the copolymer. In a further alternative, the concentration ranges from about 94% by weight to about 97% by weight.

In accordance with one embodiment, the concentration of ethylene, and/or propylene in the copolymer is in an amount ranging from about 1% by weight to about 10% by weight of the copolymer. Alternatively, the concentration ranges from about 3% by weight to about 9% by weight of the copolymer. In a further alternative, the concentration ranges from about 4% by weight to about 8% by weight of the copolymer.

Particularly useful isotactic copolymers of butene-1 and ethylene can be purchased from, for example, Basell under the series of PB-1™ trade designations, including DP 8911M and DP 8910 PC. PB-1™, is obtained by polymerization of butene-1 with a stereo-specific Ziegler-Natta catalyst to create a linear, high molecular, isotactic, semi-crystalline polymer.

A small amount of a metallocene catalyzed propylene homopolymer can be included with the isotactic butene-1 copolymer-based composition in an amount that is sufficiently small to so as not to destroy the desired securably releasing property of the composition, preferably no greater than about 5% by weight.

A2. Metallocene catalyzed propylene homopolymers:

Metallocene catalyzed propylene homopolymers refer to the homopolymers of propylene that are prepared using metallocene catalysts. Useful metallocene catalyzed propylene homopolymers include those homopolymers of propylene that are grafted with maleic anhydride. Suitable metallocene catalyzed propylene homopolymers include metallocene catalyzed propylene homopolymers having a heat of fusion ($\Delta H$) of no greater than about 40 J/g, a melt viscosity of greater than about 40 centipoise (cps), greater than about 2000 cps, or even greater than about 5000 cps at 177° C., a softening point of from about 90° C. to about 150° C., or a combination of theses properties. Useful metallocene catalyzed polypropylene homopolymers have a specific gravity of from about 0.85 to about 0.95. Preferably, the metallocene catalyzed propylene homopolymers are colorless.

The hot melt composition may include one metallocene catalyzed propylene homopolymer, or a blend of two or more metallocene catalyzed propylene homopolymers. Where the hot melt composition includes more than one metallocene catalyzed propylene homopolymer, at least one of the metallocene catalyzed propylene homopolymers preferably has a heat of fusion of no greater than about 40 J/g.

Examples of useful commercially available metallocene catalyzed propylene homopolymers include those metallocene catalyzed propylene homopolymers available under the TP LICOCENE PP series of trade designations including, e.g., TP LICOCENE PP 1302, 1502, 1602, 6102 and MA 6265 from Clariant (Coventry, R.I.). Other useful metallocene catalyzed propylene homopolymers are disclosed in, e.g., US 2006/0074171 A1, US 2005/0288412 A1, U.S. Pat. No. 6,797,774, and US 2005/159566 A1, and incorporated herein by reference.

The composition can include metallocene catalyzed propylene homopolymer can be used in an amount of from about 20% by weight to about 80% by weight, or even from about 30% by weight to about 70% by weight, based on the total weight of the composition.

A small amount of a isotactic butene-1 copolymer can be included in the metallocene catalyzed propylene homopolymer-based composition in an amount that is sufficiently small so as not to destroy the desired securably releasing property of the composition, preferably no greater than about 5% by weight. One example of a useful commercially available isotactic butene-1 copolymer is DP 8911M from Basell.

B. Wax:

The term "wax" is recognized in the art and is intended to include any viscosity, speed of set, or rheology modifiers. The wax can be, but is not limited to, paraffin wax, microcrystalline wax, synthetic wax (preferably high melt point), or functionalized versions of these. The concentration of the wax is in an amount ranging from about 0% by weight to about 60% by weight, from about 5% by weight to about 60% by weight, or even from about 10% by weight to about 40% by weight, based on the total weight the composition. Various waxes can be purchased from, for example, ExxonMobil Chemical, Calumet, and Baker Petrolite.

The wax has been found to provide and/or contribute to numerous benefits when used with the other components. For example, it can help reduce the viscosity of the composition, making the composition easier to apply to the substrate. Further, the wax can provide faster speed of set for the composition. Importantly, addition of the wax can lead to a subsequent crystallization of the composition as a result of its combination with the isotactic copolymer of butene-1 and/or the metallocene catalyzed propylene homopolymer, thereby resulting in the desired subsequent loss of adhesion.

C. Tackifying Resin:

The composition also includes a tackifying resin. The term "tackifying resin" is recognized in the art and is intended to include those substances that provide tack and specific adhesion to the composition, thereby serving to secure elements to be bonded while the composition sets, and reduces the viscosity of the composition, making the composition easier to apply to the substrate. The tackifying resin can be, but is not limited to, rosins, rosin derivatives, terpenes, modified terpene resins, hydrocarbons, or modified hydrocarbon resins, such as those known in the art. The concentration of the tackifying resin in the composition of the invention is in an amount ranging from about 5% by weight to about 70% by weight, or from about 10% by weight to about 60% by weight, or from about 25% by weight to about 55% by weight, based on the total weight of the composition. Various tackifying resins can be purchased from, for example, Arizona Chemical, Exxon Mobil Chemical, and Eastman Chemical.

D. Optional Ingredients:

In accordance with one embodiment, the composition of the invention includes an antioxidant. The term "antioxidant" is recognized in the art and is intended to include those substances that interfere with the auto-oxidation process. The antioxidant stabilizes the adhesive formulation of the invention against degradation. The antioxidant can be, but is not limited to, IRGANOX 565™, IRGANOX 1010™, and IRGANOX 1076™, which are hindered phenolic antioxidants and are available from Ciba Geigy. The concentration of the antioxidant in the composition of the invention may be in an amount ranging from about 0.1% by weight to about 1% by weight, based on the total weight of the composition.

The composition may also include colorants/pigments/dyes as may be desirable for the adhesive to match the coloring of the substrate for aesthetic purposes.

The composition can also include other additives and additional polymers in an amount that would not affect the securably releasing property of the hot melt composition. Suitable additional polymers include, e.g., ethylene copolymers (e.g., ethylene vinyl acetate), amorphous polyalphaolefin copolymer, polyethylene homopolymer, and combinations thereof. Where at least one additional polymer is present in the composition, the base polymer is present in an amount sufficient to maintain the securably releasing properties of the composition. The base polymer is preferably present in an amount of at least 50% by weight based on the total weight of all polymer (i.e., total polymer content) (i.e., base polymer plus additional polymer). The total polymer content includes at least 50% by weight, at least 75% by weight, at least 80% by weight or even at least 90% by weight base polymer.

One example of a useful amorphous poly-alpha olefin copolymer is commercially available under the trade designation REXTAC APAO 2115 from Huntsman Polymer Corporation (The Woodlands, Tex.).

II. Methods of Making Composition: In one aspect of the invention, the composition is made in the following manner. The components of the composition, other than any polymers to be included, are blended in a molten state at any known temperature for blending components of a hot melt adhesive to form a mixture (e.g. until smooth and homogeneous). Alternatively, the components are melted at a temperature ranging from about 150° C. to about 175° C. According to one embodiment, the components are melted in a forced-air type oven. The temperature of the mixture may be maintained, e.g., using a heating mantle such as those manufactured by Glas-Col in Terre Haute, Ind. or by any known method or apparatus. The polymer component or components can then be added to the mixture, such as by using an upright or lightening mixer such as the STIRRER TYPE RZRI™ manufactured by Caframo in Wiarton, Ontario, Canada. Alternatively, the polymer or polymers can be added by any known method or apparatus.

In one aspect of the invention, any antioxidant component is added with the initial components. Alternatively, the antioxidant is added at any time during the preparation of the composition, including when the polymer or polymers are added.

In a more specific method of making compositions of the invention, hoppers are filled with the components and metered into a twin-screw extruder. The material then is extruded together under high shear through the system with minimal heat exposure and a short duration, at which point the material is cut into pellets.

III. Articles, Uses & Adhesive Bond Properties: In use, the composition of the invention can be applied to a first substrate to temporarily bond the first substrate to a second substrate. For example, the composition is particularly useful in temporarily adhering two or more containers together. As used herein, the term "containers" includes but is not limited to paperboard cartons, bottles, corrugated boxes, bags (paper and plastic) and the like. Similarly, "substrates" means any surface being bonded unless otherwise specified. Examples of substrates include glass, plastics, plastic films, tag, tail tie tissue, paper, paperboard, corrugated paperboard, and combinations thereof.

One particularly useful application involves temporarily adhering paperboard cartons such as those commonly used for delivering consumer goods to the general public, e.g. at a grocery store. It is often desirable for such cartons to be temporarily secured together while the cartons are, e.g. filled with goods and/or sealed on an automated line. The composition has initial bond strength sufficient to hold the bonded cartons together during processing as desired, but then has subsequent loss of adhesion such that the cartons can easily be separated, e.g. at a point of sale. Such separation occurs without leaving unsightly fiber tear on the cartons. Similarly, the compositions of the present invention can be used to hold two or more containers together during transport to the final point of sale such as a grocery store. In one embodiment, at least one of the substrates is a coupon, tag, or other substrate that is not a container that needs to be temporarily adhered to, e.g., a package, and subsequently removed without damaging the container, the coupon, or the tag.

It is useful for the compositions to have viscosities such that they can be placed into known hot melt adhesive application equipment and extruded through a nozzle on the application equipment or applied to a roller and transferred to a first substrate creating a first bonding surface. A second substrate can then be mated with the first bonding surface. In one embodiment, the compositions have viscosities of from about 40 centipoises (cps) to about 2000 cps as measured in accordance with ASTM D-3236 taken at 350° F. (177° C.). The melt viscosities of the hot melt adhesives are determined on a Brookfield Thermosel Viscometer Model LVDV 2+ using an appropriate spindle and speed. Alternatively, the composition is applied to a first substrate by any known method in order to ultimately bond the first substrate to a second substrate through the compositions of the invention.

The period of time required for the bond to form is called the "Set Time". After the mating of the two substrates, the composition initially exhibits adhesion quality that causes a bond to form between the two substrates. A bond forms in a time period ranging, e.g., from about 0.5 seconds to about 10 minutes after application. This is the "Set Time" for the adhesive, which can conveniently be determined by the test method below. Alternatively, the bond forms in a time period ranging from about 1 second (or even less) to about 20 seconds, or even from about 5 seconds to about 10 seconds. Having a fast enough Set Time, such as provided by some of the compositions of the invention, is important particularly for high-speed automated applications. The composition is required to have sufficient bond strength to sustain the intended end use, such as adhering two packages. Thus, the Separation Resistance Test described below is used to test the strength of adhesion. After a period of time, the composition begins to lose adhesion, and the bond between the two substrates is thereby weakened to the point that the two substrates can be easily separated without Fiber Tear ("FT"). It should be understood that even when the substrates do not give fiber tear (e.g. plastic bottles), the tests set forth herein for Fiber Tear are still useful for identifying loss of adhesion of an adhesive of the invention. The composition loses adhesion (i.e., has no FT) in a time period ranging from about 11 minutes to about 24 hours after application of the composition or, the composition loses adhesion in a time period ranging from about 20 minutes to about 18 hours, from about 40 minutes to about 8 hours, or even from 1 hour to about 4 hours after application of the composition. The loss of adhesion can be tested according to the Coupon Test or the Modified Coupon Test at various time intervals in order to mimic the effect an adhesive has on the aesthetics of a substrate upon separation. The time at which the Coupon Test or the Modified Coupon Test results in no Fiber Tear is a time by which the composition has lost adhesion. For the purpose of clarity, an adhesive demonstrating no Fiber Tear at 8 hours after application means that by 8 hours, the composition has lost adhesion sometime at or before 8 hours (i.e. it could have lost Fiber Tear at 2 hours). However, if the same adhesive has Fiber Tear at 4 hours, the composition looses adhesion somewhere after 4 hours and on or before 8 hours.

According to one embodiment, the composition is non-tacky after losing adhesion. As used herein, the term "non-pressure sensitive adhesive" refers to a composition that is not tacky after losing adhesion. A non-pressure sensitive adhesive may have a Loop Tack value, as defined herein, of less than about 5 ounces per inch after the adhesive loses adhesion as defined in the Coupon Test above. Alternatively, the composition may remain tacky where such a feature is not a detriment for the end application.

In accordance with a further aspect of the invention, the composition, as or after it loses adhesion, takes on a brittle, crystallized form. In this form, the composition can have a white appearance and/or can have a Gardner Color of about 1 or about 2. Such a white appearance typically has little or no negative aesthetic impact regardless of the color of the substrate it is bonding, and therefore may be desirable where multiple colors of substrates will be bonded by the same adhesive. Alternatively, the composition can be a different color and can even be colored to match the substrate color.

IV. Test Methods: The compositions of the invention exhibit a unique set of physical properties over time as described above. The methods of testing for these physical properties at the various times are described herein.

COCA COLA® CLASSIC COKE FRIDGE PACK paperboard from MeadWestvaco Packaging Systems (Atlanta, Ga.), exhibits a surface strength, as determined according to the Critical Wax Strength Number ("CWSN") test method using Dennison Standard Paper Testing Kit including waxes and wood block included therein, of 9 or 10.

Critical Wax Strength Number ("CWSN") Test Method

CWSN is determined as follows. Place the specimen to be tested on a smooth surface, not glass or metal or artificially cooled—a hardwood block or table is sufficient.

1.) Select a wax stick from the set of Dennison Standard Paper Testing Waxes making certain that the end of the wax stick is clean and flat. Heat the end of the wax stick over a low gas flame, rotating it slowly until several drops of melted wax have fallen. (Do not let it catch fire.)
2.) Quickly place the melted end of the wax stick on the surface of the test specimen with firm but not undue pressure, and withdraw the fingers immediately. Allow 15 minutes for the wax stick to cool.
3.) Take the wooden block from the Dennison Standard Paper Testing kit and place the 1¼ "hole of the wooden block over the wax stick such that the wax sick protrudes through the hole in the block. Press the block down firmly with one hand and with the other pull the wax stick from the sheet with a quick jerk at a right angle to (i.e., perpendicularly upward and way from) the surface of the test specimen.
4.) Repeat steps 1-3 using wax sticks sequentially in ascending numerical order until the wax stick does not produce substrate failure when pulled off the specimen surface.

Record the highest number of the wax stick that does not produce substrate failure when pulled off the specimen surface as that sample's Critical Wax Strength Number (CWSN).

A. Fiber Tear ("FT"):

Fiber Tear measures the amount of fiber deposited on an adhesive when two substrates that are bonded together through the adhesive are separated. Specifically, the adhesive left on one of the two substrates is examined for fibers from the second of the two substrates. The percent FT is the visual estimation of the percent of the surface area that the fibers comprise of the total surface area of the adhesive. For purposes of the present invention, in a preferred embodiment any amount of FT that is visually noticeable with the naked eye is aesthetically undesirable. Systems having such visually noticeable FT may be reported as a qualitative "Fiber Tear", and those not having such visually noticeable FT (about 0%) may be reported as a qualitative "No Fiber Tear". FT is measured herein by a "Coupon Test" as follows.

A1 The Coupon Test:

Two 1.5 in$^2$ pieces of the paperboard cut from COCA COLA® CLASSIC COKE FRIDGE PACK paperboard having a CWSN of 9 or 10 are used as both the first substrate and the second substrate of the test. A 7-millimeter diameter dot of an adhesive is deposited on the first substrate using a MINI-SQUIRT™ at 350° F. (and ambient atmosphere). The second substrate is mated to the first substrate through the adhesive dot and compressed within about 3 seconds. The resulting bonds are then pulled apart by hand at various time intervals ranging from 1 second to 24 hours and the substrates are examined for Fiber Tear. When doing the test, 3 samples should be tested at each time interval and a subjective, non-quantitative determination of "Fiber Tear" or "No Fiber Tear" shall be made by the tester. For the purpose of clarity, the tester of ordinary skill in the art may notice that 2 of the 3 samples clearly have "No Fiber Tear" and the 3$^{rd}$ one has a very small amount of "Fiber Tear", but still may report that time interval as having "No Fiber Tear" within their reasonable discretion.

It is desirable to have FT at 1 minute demonstrating the existence of a bond up until at least this 1-minute mark. However, it is recognized that there may be some applications where a slower set time (e.g., in about 5 to 10 minutes) is acceptable. If the adhesive has either not set or has lost the bond by the 10 minute mark, it is said to "Fail" the Coupon Test since it is desirable for the adhesives of the invention to have adhesion sufficient to induce FT by about 10 minutes. As an indication of the loss of adhesion over time, it is desirable to have no FT after about 30 minutes, or 1 hour, or even 2 hours or greater from application of the adhesive. If the adhesion is lost after 1 minute and before about 11 minutes, it is also said to "fail" due to a premature release. Thus, the Coupon Test results can be reported by listing any time interval where the adhesive gives "no Fiber Tear", although one of ordinary skill in the art should recognize that an adhesive/substrate having "no Fiber Tear" at 30 minutes, and "Fiber Tear" at 5 minutes means that it is possible there would also be "no Fiber Tear" at 10 minutes. If more precision was desired, the tester could also test at 10 minutes. However, one of ordinary skill in the art will also recognize that, like many tests, there is some subjectivity to the test, so too many data points at close time intervals will not be useful.

A2 Modified Coupon Test:

Where it is desirable to ultimately bond surfaces substantially different from the COCA COLA® CLASSIC COKE FRIDGE PACK paperboard, the Coupon Test can be modified and the substrate(s) intended to be bonded can be substituted for the COCA COLA® CLASSIC COKE FRIDGE PACK paperboard test substrates (the two substrates can be 2 different substrates, as well). This will be referred to as a "Modified Coupon Test" herein.

The test procedure of the Modified Coupon Test is the same as the above described Coupon Test except that the requirement for the first and the second substrates is different. For the Modified Coupon Test, both the first and the second substrates can be cut from the same material (e.g., a material other than the paperboard from the COCA COLA® CLASSIC COKE FRIDGE PACK), or they can be cut from two different materials, one of which can be COCA COLA® CLASSIC COKE FRIDGE PACK paperboard.

The Modified Coupon Test can be a useful, quick test to help determine, e.g., more specifically, when the specific substrates to be bonded can be separated without Fiber Tear for a particular adhesive. Thus, the Modified Coupon Test can be particularly useful in quickly identifying the very best product for a particular application.

A3. Median Coupon Test

The test procedure of the Median Coupon Test is the same as the above described Coupon Test with the exception that five (5) samples are tested and the percent of the fiber tear of each sample is visually estimated. The median percent of the fiber tear of the five (5) samples is reported. For avoidance of doubt, the percent of fiber tear is visually estimated by comparing the % of surface area of the adhesive dot that is covered by fibers from the paperboard.

A4. Modified Median Coupon Test

The test procedure of the Modified Median Coupon Test is the same as the above-described Median Coupon Test except that the first and second substrate materials are the same as the substrate materials used in the above-described Modified Coupon Test.

Both the Median Coupon Test and the Modified Median Coupon Test can be a useful, quick tests for a particular adhesive to determine, e.g., more specifically, when the specific substrates to be bonded can be separated with the least Fiber Tear, e.g., not greater than 20%, or not greater than 10% fiber tear at 24 hours, which is commercially feasible and acceptable even though it is desirable that there would be no Fiber Tear (or 0% fiber tear) at 24 hours.

B. Separation Resistance: Separation Resistance is a measure of adhesiveness related to the amount of force required to separate two paperboard boxes that are mated to each other using an adhesive of the present invention. FIGS. 1 and 2 are intended to assist with setting up this test. The test uses two paperboard FRIDGE PACK boxes used for packaging COCA COLA® CLASSIC COKE products (as described above) having dimensions of 15.5 inches long by 5.25 inches wide by 5.25 inches high and have contents with a total weight of 4500 grams. For purposes of the test, six dots 10 of about the same size, totaling about 0.6 grams of adhesive, are applied to one external surface (measuring 15.5 inches long by 5.25 inches high) of the first box 1. The dots are applied in the following manner. One dot is placed in each corner of the box side and each of the remaining two dots is placed at the mid-point along each of the two long edges of the box side. Care is taken to apply the adhesive at the can peaks (the rounded edge portion in contact with the box edge rather than in between two cans) in order to get adequate adhesion upon mating the boxes.

After one second, a second box 2 is mated to the first box 1 such that the side of the first box with the adhesive dots is mated to a side of the second box with the same dimensions, &liming an adhesive bond line 4. The mated boxes are then placed such that they are positioned side-by-side on a typical smooth epoxy finish black lab bench top. A string 6 is then attached to the center of the first box end 8. After, e.g., either 10 seconds or 1 minute from the time the cartons were mated, the first box end is gently (without quick or jerky motions) pulled away from the second box by applying a pulling force in a direction away from and perpendicular to the adhesive bond line 4 for a distance of about a typical adult arm's length (the first box end may follow a curved path with the end opposite the string attachment moving very little). The point of this test is to mimic normal forces that may cause the boxes to prematurely separate, e.g., on an automated line, if the adhesive is not strong enough. The test can be repeated at various time intervals. The Separation Resistance test is said to "fail" if there is a premature release of the cartons without fiber tear as when the adhesive has little/no strength because it has not set up or it releases prematurely. The test is said to "pass" if the boxes remain attached for the duration of the test or if they separate, but with Fiber Tear (Fiber Tear here indicates the box failed, not the adhesive).

Where it is desirable to ultimately bond packages weighing substantially less than 4500 grams, a Modified Separation Resistance test can be used as the adhesive will not be required to produce as strong of a bond in order to function for its intended purpose. In the Modified test, the COCA COLA® CLASSIC COKE FRIDGE PACKS are filled with only 300 grams and the Separation Resistance test as described above is otherwise repeated. The "pass" and "fail" definitions above also apply.

Alternatively, in a Customized Separation Resistance test, representative samples of the actual, full, rectangular paperboard packages intended to be temporarily bonded together are used in the Separation Resistance test described above so that not only the weight, but also the substrate surface match the "real world" exactly. One of ordinary skill in the art will readily recognize how to customize the test to scale the test to fit the package size. For example, the string should be attached to a smallest end of the package if the package has sides of varying surface areas. A package side having the greatest surface area should be in contact with the bench top. The adhesive will be applied to a surface of a first package that will be mated to a surface of the second package as described above.

C. Set Time: The Set Time of the adhesives of the present invention can be measured using the Separation Resistance test. Once the packages are mated, the test is performed at 10-second intervals (or less if more precision is desired) and the first time at which the Separation Resistance test is passed equals the Set Time for that adhesive. If more precision is desired, the Modified Separation Resistance test can be used.

D. Loop Tack: Loop Tack is a measure of tackiness. More specifically, Loop Tack is a measure of adhesion to a steel surface and is measured using a Loop Tack Tester available from Cheminstruments in Fairfield, Ohio. First, the adhesive being tested is coated on Mylar, which is cut into 1⅛ inch×5 inch strips. Each strip is formed into a loop in which the adhesive is on the outer surface of the loop, and the loop is placed into contact with a steel plate in the tester. The tester measures the force required to remove the loop from the steel plate in ounces per inch. For purposes of the present invention, Loop Tack is measured after the adhesive has lost adhesion according to the Coupon Test (e.g. 1 minute after the Coupon Test shows no fiber tear) as the intent is to determine whether or not the adhesive is tacky or is a non-pressure sensitive adhesive after it has performed the intended purpose of temporarily adhering two substrates together.

E. Gardner Color: Gardner Color is a measure of color. The sample adhesive is compared to the Gardner Color Standards as set forth in ASTM D-1544. The color is identified by choosing the color standard of the 18 Gardner Color Standards that most closely matches the sample color.

The following examples are presented by way of demonstration, and not limitation, of the invention. The comparative examples are provided to demonstrate examples outside the scope of the invention. All the parts, percentages, ratios, amounts are by weight except otherwise specified.

F. Heat of Fusion ($\Delta H$):

Heat of Fusion ($\Delta H$) is determined by Differential Scanning calorimetry (DSC) measurements using a Perkin-Elmer DSC Instrument at a heating rate of 10° C./min from the second heating according to ASTM E793-01 entitled, "Standard Test Method for Enthalpies of Fusion and Crystallization by Differential Scanning Calorimetry."

The following examples are presented by way of demonstration, and not limitation, of the invention. The comparative examples are provided to demonstrate examples outside the scope of the invention. All the parts, percentages, ratios, amounts are by weight except otherwise specified.

TABLE 1

| Formulas | Example 1 | Example 2 | Example 3 | Example 4 |
|---|---|---|---|---|
| DP-8910PC (PB-1 ™-Basell) (isotactic copolymer of butene-1 and ethylene) | 33.25% | 35% | 40% | 35% |
| Escorez 5637 from Exxon (tackifying resin) | 28.5% | 30% | 34.5% | 34.5% |
| CALUMET FR6513 (Paraffin 155 ™ wax) | 32.75% | 34.5 | — | 15% |
| Irganox ® 1010 from Ciba Geigy (antioxidant) | 0.5% | 0.5% | 0.5% | 0.5% |
| PX-100 ™ from Petrolite (wax) | 5% | — | — | — |
| Paraflint C80 ™ from Moore & Munger (wax) | — | — | 25% | 15% |
| Viscosity (cps at 350° F.) | 650 | 820 | 1830 | 920 |

TABLE 2

| Properties | Example 1 | Example 2 | Example 3 | Example 4 |
|---|---|---|---|---|
| Separation Resistance (Set Time -10 seconds) | Pass | Pass | Pass | Pass |
| Separation Resistance (1 minute) | Pass | Pass | Pass | Pass |
| Separation Resistance (10 Minutes) | Pass | Pass | Pass | Pass |
| Coupon Test and Modified Coupon Test x=: | No FT at x min. | No FT at x hours, x=: | No FT at x min. x=: | No FT at x min. x=: |
| a. COCA COLA ® CLASSIC | a. 40 | a. 3-4 | a. 20-30 | a. 20-30 |
| b. Caffeine Free COCA COLA ® CLASSIC | b. 60 c. 50 | b. 2-3 c. 3-4 | | |
| c. SPRITE ® | d. 15 | d. 1.5-2 | | |
| d. Diet SPRITE ® | e. 210 | e. FT[1] | | |
| e. Vanilla COKE ® | f. 50 | f. 1.5-2 | | |
| f. MINUTE MAID ® | g. 210 | g. FT1 | | |
| g. DR. PEPPER ® | h. 90 | h. FT[1] | | |
| h. Diet DR. Pepper ® | i. 20 | i. 2-3 | | |
| i. Diet COKE ® | | | | |
| Modified Separation Resistance Test (Set Time- 10seconds) | Pass | Pass | Pass | Pass |
| Modified Separation Resistance Test (1 minute) | Pass | Pass | Pass | Pass |
| Gardner Color of adhesive after non-adhesion | 2 (white) | 2 (white) | 2 (white) | 2 (white) |
| Loop Tack after loss of adhesion (ounces/inch) | <5 | <5 | <5 | <5 |

[1]"FT" here means there is still significant fiber tear after 24 hours

TABLE 3

| Formulas | Example 5 | Example 6 | Example 7 | Example 8 |
|---|---|---|---|---|
| DP-8910PC (PB-1 TM-Basell) (isotactic copolymer of butene-1 and ethylene) | 10% | 24.9% | 29.9% | 35% |
| PB-0800M from Basell (homopolymer of butene-1) | — | 8.35% | 3.35% | — |
| Escorez 5637 from Exxon (tackifying resin) | 29.5% | 28.5% | 28.5% | 34.5% |
| CALUMET FR6513 (Paraffin 155 ™ wax) | — | 32.75% | 32.75% | — |
| Irganox ® 1010 from Ciba Geigy (antioxidant) | 0.5% | 0.5% | 0.5% | 0.5% |
| PX-100 ™ from Petrolite (wax) | 60% | 5% | 5% | 30% |
| Sasolwax C-80 | — | — | — | — |
| Viscosity (cps at 350° F.) | 40 | 690 | 675 | 1336 |

TABLE 4

| Properties | Example 5 | Example 6 | Example 7 | Example 8 |
|---|---|---|---|---|
| Separation Resistance (Set Time) (10 seconds) | Fail | Pass | Pass | Pass |
| Separation Resistance (1 minute) | Fail | Pass | Pass | Pass |
| Separation Resistance (10 Minutes) | Fail | Pass | Pass | Pass |
| Coupon Test on COCA COLA ® CLASSIC | No FT at <.5 minutes | No FT at 15 minutes | No FT at 35 minutes | No FT at 15 minutes |
| Modified Separation Resistance Test (Set Time) (10 seconds) | Pass | Pass | | |

TABLE 4-continued

| Properties | Example 5 | Example 6 | Example 7 | Example 8 |
|---|---|---|---|---|
| Modified Separation Resistance Test (1 minute) | Pass | Pass | | |
| Gardner Color of adhesive after non-adhesion | 2 (white) | 2 (white) | 2 (white) | 2 (white) |
| Loop Tack after loss of adhesion (ounces/inch) | <5 | <5 | <5 | <5 |

Alternatively, the Examples 1-8 are formulated with isotactic copolymers of butene-1 and a member selected from the group consisting of methylene, ethylene, and/or propylene instead of the DP-8910PC.

TABLE 5

| Formulas | Ex 9 | Ex 10 | Ex 11 | Ex 12 | Ex 13 | Ex 14 | Ex 15 | Ex 16 |
|---|---|---|---|---|---|---|---|---|
| LICOCENE 1602[1] (ΔH: 30) | 30% | — | — | 36% | 42% | 42% | 37% | 37% |
| LICOCENE 1302[2] (ΔH: 30) | — | 70% | 50% | — | — | — | — | — |
| LICOCENE 6102[3] (ΔH: 80) | — | — | — | — | — | 25% | — | — |
| Polybutene DP 8911M | — | — | — | — | — | — | 5% | — |
| REXTAC RT 2115[4] | — | — | — | — | — | — | — | 5% |
| ESCOREZ 5637 (tackifying resin) | 70% | — | — | — | 32.5% | 32.5% | 32.5% | 32.5% |
| EASTOTAC H130W (tackifying resin) | — | 30% | 50% | 54% | — | — | — | — |
| Sasolwax C-80 | — | — | — | — | 25% | — | 25% | 25% |
| CALUMET FR6513 (Paraffin 155 ™ wax) | — | — | — | 10% | — | — | — | — |
| IRGANOX 1010 (antioxidant) | — | — | — | — | 0.5% | 0.5% | 0.5% | 0.5% |
| Viscosity (cps at 350° F.) | 1455 | 180 | 195 | 700 | 505 | 1050 | 435 | 455 |

1 = Metallocene catalyzed polypropylene having a heat of fusion of 30 J/g flom Clariant (Rhode Island).
2 = Metallocene catalyzed polypropylene having a heat of fusion of 30 J/g from Clariant.
3 = Metallocene catalyzed polypropylene having a heat of fusion of 80 J/g from Clariant.
4 = amorphous polyalpha olefin polymer from Hunstman International (The Woodlands, Texas)

TABLE 6

| Properties | Ex 9 | Ex 10 | Ex 11 | Ex 12 | Ex 13 | Ex 14 | Ex 15 | Ex 16 |
|---|---|---|---|---|---|---|---|---|
| Median Coupon Test @10 min (% fiber tear) | 70 | 90 | 90 | 100 | 93 | 70 | 90 | 85 |
| Median Coupon Test @24 hr ("% fiber tear) | 5 | 0 | 0 | 0 | 5 | 0 | 10 | 0 |
| Gardner Color of adhesive after non-adhesion | 2 white | 2 white | 2 white | 2 white | 2 white | 2 white | 2 white | 2 white |
| Loop Tack after loss of adhesion (ounces/inch) | <5 | <5 | <5 | <5 | <5 | <5 | <5 | <5 |

TABLE 7

| Comparative Formulas | Comparative Example 1 | Comparative Example 2 | Comparative Example 3 | Comparative Example 4 |
|---|---|---|---|---|
| Escorez 5637 from Exxon (tackifying resin) | 28.5% | 28.5% | 28.5% | 50% |
| CALUMET FR6513 (Paraffin 155 ™ wax) | 32.75% | 32.75% | 32.75% | — |
| Irganox ® 1010 from Ciba Geigy (antioxidant) | 0.5% | 0.5% | 0.5% | 0.5% |
| PX-100 ™ from Petrolite (wax) | 5% | 5% | 5% | — |
| GA-1900 from Dow | 33.25% | — | — | — |
| EVA 28-800 from AT Plastics (EVA polymer) | — | 33.25% | — | — |
| Epolene C16 from Eastman Chemical | — | — | 33.25% | — |
| PB-0800M from Basell (homopolymer of butene-1) | — | — | — | 12.5% |
| DP-8910PC (PB-1TM - Basell) (isotactic copolymer of butene-1 and ethylene) | — | — | — | 37% |

TABLE 8

| Comparative Properties | Comparative Example 1 | Comparative Example 2 | Comparative Example 3 | Comparative Example 4 |
|---|---|---|---|---|
| Separation Resistance (10 seconds) (Set Time) | Fail | Pass | Pass | — |
| Separation Resistance (1 minute) | Fail | Fail | Fail | — |
| Coupon Test | No FT at 1 minute . . . Fail | No FT at 1 minute . . . Fail | No FT at 1 minute . . . Fail | FT after 24 hours . . . Fail |

Comparative Example 5 is a standard EVA based packaging hot melt commercially available from H.B. Fuller Company as HM 2835Y. It contains no homopolymers or isotactic copolymers of butene-1, or no metallocene catalyzed polypropylene homopolymer. It passes both the 10 second and the 1 minute Separation Resistance test, but does not release in the Coupon Test after 24 hours (fails).

Comparative Example 6 is a standard EVA based packaging hot melt commercially available from H.B. Fuller Company as HL 7674. It contains no homopolymers or isotactic copolymers of butene-1, or no metallocene catalyzed polypropylene homopolymer. It does not release in the Coupon Test after 24 hours (fails).

TABLE 9

| Formulas | Comp Ex 7 | Comp. Ex 8 | Comp. Ex 9 | Comp. Ex 10 | Comp. Ex 11 |
|---|---|---|---|---|---|
| LICOCENE 1602 | 20% | 80% | | | 33.5% |
| LICOCENE 4202[5] (ΔH: 60) | | | 50% | | |
| LICOCENE 6102 | | | | 50% | 33.5% |
| Escorez 5637 (tackifying resin) | 80% | 20% | 50% | 50% | 32.5% |
| Irganox ® 1010 (antioxidant) | | | | | 0.5% |

[5]= Metallocene catalyzed polypropylene having a heat of fusion of 60 J/g from Clariant.

TABLE 10

| Comparative Properties | Comparative Example 7 | Comparative Example 8 | Comparative Example 9 | Comparative Example 10 | Comparative Example 11 |
|---|---|---|---|---|---|
| Median Coupon Test @10 min (% fiber tear) | 0 | 100 | 0 | 0 | 0 |
| Median Coupon Test @ 24 hr (% fiber tear) | 5 | 100 | 0 | 0 | 0 |

All patents and patent publications referred to herein are hereby incorporated herein by reference.

Other embodiments are within the claims.

What is claimed is:

1. A method of using a hot melt composition to temporarily adhesively bond a first substrate and a second substrate, the method comprising:
 a) applying the composition to a first surface of the first substrate to create a first bonding surface; and
 b) contacting the first bonding surface to the second substrate to form a bond,
 the composition consisting essentially of metallocene catalyzed polypropylene homopolymer, tackifying resin, and wax, and
 the composition exhibiting at least about 60% fiber tear after 10 minutes and no greater than about 20% fiber tear after 24 hours when tested according to at least one of the Median Coupon Test and the Modified Median Coupon Test.

2. The method of claim 1, wherein the metallocene catalyzed polypropylene homopolymer has a heat of fusion of no greater than about 40 J/g.

3. The method of claim 1, wherein the composition consists essentially of from about 20% by weight to about 80% by weight metallocene catalyzed polypropylene homopolymer, from about 5% by weight to about 70% by weight tackifying resin, and from about 5% by weight to about 60% by weight wax.

4. The method of claim 1, wherein the composition further comprises a polymer other than a metallocene catalyzed polypropylene homopolymer.

5. The method of claim 4, wherein the polymer comprises an isotactic copolymer of butene-1.

6. The method of claim 1, wherein at least one of the substrates comprises at least one of paperboard and corrugated paperboard.

7. The method of claim 1, wherein the composition exhibits at least about 70% fiber tear after about 10 minutes and no greater than about 10% fiber tear after about 24 hours when tested according to at least one of the Median Coupon Test and the Modified Median Coupon Test.

8. The method of claim 1, wherein the composition exhibits a melt viscosity of from about 40 cps to about 2,000 cps at 350° F. (177° C.).

9. A method of temporarily adhering a first container to a second container, the method comprising:
- a) applying a hot melt composition comprising a metallocene catalyzed polypropylene homopolymer to a first surface of the first container to form a first bonding surface; and
- b) contacting the first bonding surface of the first container with the second container to temporarily adhesively bond the first container to the second container through the composition.

10. The method of claim 9, further comprising allowing the composition to lose adhesion, thereby allowing the second container to separate from the first container with no greater than about 20% fiber tear after 24 hours when tested according to at least one of the Median Coupon Test and the Modified Median Coupon Test.

11. The method of claim 9, wherein the first and the second containers are paperboard containers.

12. The method of claim 9, wherein the composition exhibits a Loop Tack of less than about 5 ounces per inch.

13. The method of claim 9, wherein the composition further comprises tackifying resin, wax, antioxidant, or a combination thereof.

14. The method of claim 9, wherein the metallocene catalyzed polypropylene homopolymer has a heat of fusion of no greater than about 40 J/g.

15. The method of claim 9, wherein at least one of the first and the second containers is filled with consumer goods, the consumer goods having been placed into the container on an automated packaging line, and the temporarily adhesively bonded first and the second containers are separable from each other with no greater than about 20% fiber tear prior to a sale to a customer at a final point of sale.

* * * * *